INVENTOR.
Minoru Nagata
BY
Western & Western

United States Patent Office

3,241,603
Patented Mar. 22, 1966

3,241,603
AUTOMATIC TEMPERATURE CONTROL SYSTEM
Minoru Nagata, Josuihon-machi, Kodaira-shi, Japan, assignor to Kabushiki Kaisha Hitachi Seisakusho, Tokyo-to, Japan, a joint-stock company of Japan
Filed Mar. 10, 1964, Ser. No. 350,769
Claims priority, application Japan, Mar. 19, 1963, 38/12,789
1 Claim. (Cl. 165—29)

This invention relates to automatic temperature control systems of the type designed to control automatically the temperature of an object, a part thereof, or a region so as to continuously maintain the said temperature at a constant value. More specifically, the invention concerns a new automatic temperature control system of the above stated type having highly desirable features.

A temperature control system of ordinary type is generally composed of a single linear control loop to control, in response to temperature change, a heat source installed in a chamber to be temperature controlled. With only a single heat source, however, it is difficult to attain temperature control having simultaneously and in combination the desirable features of large capacity, high response, and accuracy.

It is an object of the present invention to provide an automatic temperature control system having the desirable features of large capacity, high response, and accuracy, simultaneously and in combination.

The above said object has been achieved by the present invention, which, briefly described, resides in an automatic temperature control system in which two heat sources of mutually different character are used, and, when the current which should be supplied to the first heat source becomes high and reaches a predetermined value, the second heat source for precise control is caused to operate.

Figure 1:
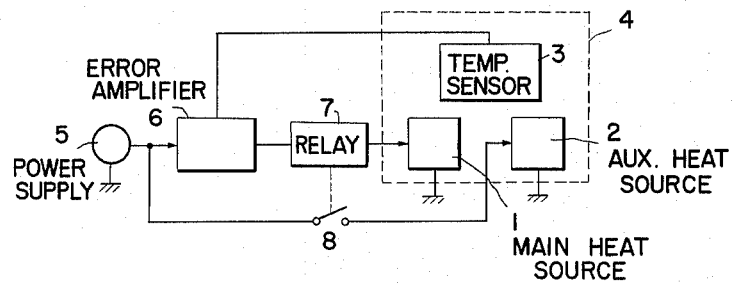
Figure 2:
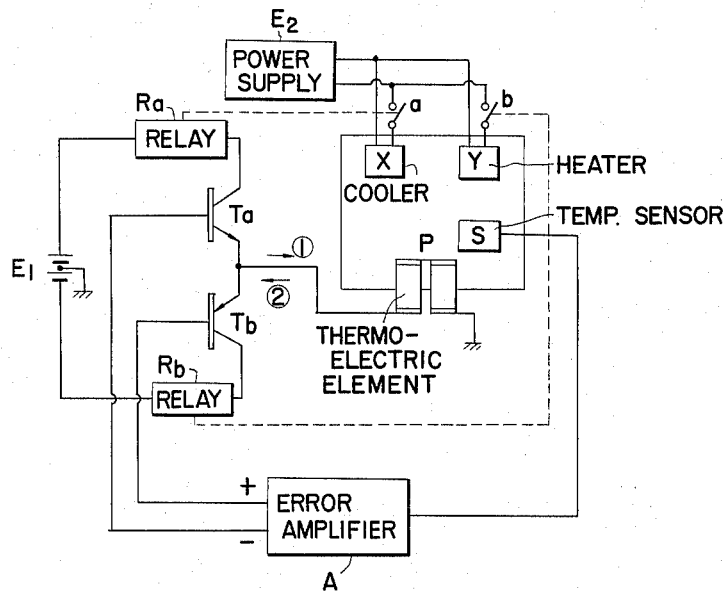

The nature, principle, and details of the invention will be more clearly apparent by reference to the following description thereof with respect to preferred embodiments thereof, when taken in conjunction with the accompanying drawing, in which:

FIGURE 1 is a schematic block diagram indicating the composition and arrangement of one embodiment of the system of the invention; and FIGURE 2 is a circuit diagram showing the composition and arrangement of a specific embodiment of the invention.

The embodiment of the invention shown in FIGURE 1 has a main heat source 1, an auxiliary heat source 2, and a temperature sensor 3 installed within a chamber 4 whose temperature is to be controlled. The system is supplied with electric power from a power supply 5 by way of an error amplifier 6 to which the temperature sensor 3 is connected. The amplifier 6 is connected through a relay 7 to the main heat source 1. On the one hand, the power supply 5 is connected also to the auxiliary heat source 2 by way of a switch 8 which is operable by the relay 7.

The system of the above described composition and arrangement operates in the following manner. The temperature sensor 3 detects any difference between the actual temperature within the chamber 4 and a predetermined setting temperature to which the chamber temperature is to be set and sends an electrical signal corresponding to the said difference to the error amplifier 6, which then amplifies this signal and sends it as its output to the relay 7 and the main heat source 1. The main heat source 1, operating in response to the output of the error amplifier 6, supplies heat energy to the chamber 4 so as to cause the output of the sensor 3 to become zero. Accordingly, the temperature within the chamber 4 is controlled and maintained at the aforesaid predetermined setting temperature.

The relay 7 is adapted to operate so as to close the switch 8 when the output of the temperature sensor 3 is greater than a certain value, that is, when the output current of the amplifier 6 exceeds a certain specified value $I_0$, thereby connecting the power supply 5 to the auxiliary heat source 2 to cause this heat source 2 to operate. The auxiliary heat source 2 thereby supplies to the chamber 4 a large quantity of heat so as to cause the high output of temperature sensor 3 to approach zero, thereby causing the temperature within the chamber to approach rapidly the predetermined setting temperature.

When the aforementioned temperature difference becomes small, the output of the amplifier 6 becomes less than the value $I_0$, the relay 7 becomes inoperative, and thereafter linear control due to only the main heat source 1 is carried out.

While the present invention is highly suitable for precise linear control such as, for example, that due to thermoelectric elements, it is particularly suitable for the case wherein a thermal source of a low absolute value of thermal energy output which can be introduced and taken out is used for the main thermal source.

A specific application of the invention to a temperature control system in which a thermoelectric element is used is illustrated in FIGURE 2. Within a chamber to be temperature controlled, there are provided thermoelectric element P, a temperature sensor S, a cooler X (for example, a fan or a refrigerating apparatus), and a heater Y (for example, an electric heater). The current of the thermoelectric element P is controlled by a circuit formed by transistors $T_a$ and $T_b$, the emitters of which are connected commonly to one terminal of the thermoelectric element P, the bases of which are connected respectively to the negative and positive output terminals of an error amplifier A, and the collectors of which are respectively connected by way of relays $R_a$ and $R_b$ to a power supply $E_1$. The output of the sensor S is led to the amplifier A. The cooler X and the heater Y are connected in parallel to a power supply $E_2$ through contacts $a$ and $b$, respectively, of the relays $R_a$ and $R_b$.

In the above described circuit, only one of the transistors $T_a$ and $T_b$ is in an operative state at any one time. For example, when the transistor $T_a$ is operating, the thermoelectric element P is supplied with a current in the direction of the arrow ① and operate as a cooling source. On the other hand, when the transistor $T_b$ is operating, a current in the direction indicated by the arrow ② flows, and the thermoelectric element P operates as a heating source.

When the output signal of the temperature sensor S is negative (that is, in the case when the temperature within the chamber is higher than a predetermined setting temperature), this negative signal is amplified by the error amplifier A and then applied to the base of the transistor $T_a$ for cooling. Thereupon, the thermoelectric element P is supplied with a current in the direction ① of a magnitude corresponding to the output of the sensor S and operate as a cooling source, thereby functioning to cause the output of the sensor to become zero.

In this case, if the output of the temperature sensor S is higher than a certain value, and, consequently, the current flowing through the emitter (or the collector) of the transistor $T_a$ reaches a predetermined value, the relay $R_a$ will operate, closing its contact $a$, to cause the separate cooling source X to operate. That is, when the output of the sensor S reaches a certain predetermined value or a higher value, and there arises the necessity of supplying a thermal energy for cooling of large magnitude to the chamber interior, the auxiliary cooler X operates together with the thermoelectric element P and rapidly lowers the temperature within the chamber, whereby control is effected to lower the output of the sensor S. When the chamber temperature accordingly approaches the setting value, the relay $R_a$ returns to its former state, and the system assumes an operational state wherein precise, linear control is accomplished by means of only the thermoelectric element.

On the other hand, when the sensor output is positive, the transistor $T_b$ operates, and when the emitter current of the transistor $T_b$ reaches a predetermined value, the relay $R_b$ operates, closing its contact $b$, to cause the auxiliary heating source Y to operate, whereby control is effected to cause the chamber temperature to approach rapidly the setting temperature. It is to be observed here that the above said relays may be inserted in their respective collector or base circuits, and if polar relays are used, they may be connected in their load circuits.

As described above, the present invention provides an automatic temperature control system wherein, in addition to a main thermal source for linear control, there is provided another auxiliary thermal source which is caused by a relay to operate when the main thermal source is called upon to supply thermal energy of a magnitude above a predetermined value. Accordingly, the system of this invention has the unique feature of being capable of automatically accomplishing temperature control with large capacity, high response, and, moreover, high accuracy.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claim.

What is claimed is:

An automatic temperature control system for regulating the temperature within a definite region which comprises, in combination, a main thermal energy source consisting of a plurality of thermoelectric elements; a coolor; a heater; one first relay each for said cooler and said heater; a power supply connected to said relays; a temperature sensor disposed within said region for detecting the temperature in said region and a predetermined set value; an error amplifier for amplification of the output of said sensor; at least one pair of transistors for causing opposite currents flow through said main thermal energy source; second relays operated by the output currents of said transistors so as to open and close, respectively, the contacts of said first relays; said transistors being connected to said error amplifier so that either one of said transistors is operated in accordance with the polarity of the output of said amplifier; said main thermal energy source being continuously controlled by the output of said transistors; said second relays being operational only when the output currents of said transistors reach said predetermined set value, thus continuously controlling said cooler and said heater.

References Cited by the Examiner
UNITED STATES PATENTS

| | | | |
|---|---|---|---|
| 2,505,565 | 4/1950 | Michel | 219—486 |
| 2,700,505 | 1/1955 | Jackson. | |
| 3,128,362 | 4/1964 | Clark et al. | 219—486 X |

EDWARD J. MICHAEL, *Primary Examiner.*